United States Patent
Fukumoto et al.

(10) Patent No.: US 8,007,036 B2
(45) Date of Patent: Aug. 30, 2011

(54) INNER PANEL FOR VEHICLE

(75) Inventors: Koji Fukumoto, Kobe (JP); Masatoshi Yoshida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/679,600

(22) PCT Filed: Oct. 6, 2008

(86) PCT No.: PCT/JP2008/068173
§ 371 (c)(1),
(2), (4) Date: Mar. 23, 2010

(87) PCT Pub. No.: WO2009/048043
PCT Pub. Date: Apr. 16, 2009

(65) Prior Publication Data
US 2010/0194148 A1  Aug. 5, 2010

(30) Foreign Application Priority Data

Oct. 11, 2007 (JP) ................................. 2007-265945

(51) Int. Cl.
*B62D 25/10* (2006.01)
(52) U.S. Cl. .................................................. 296/193.11
(58) Field of Classification Search ............. 296/193.11; 180/69.2, 69.21
See application file for complete search history.

(56) References Cited

U.S. PATENT DOCUMENTS

| | | | |
|---|---|---|---|
| 6,883,627 B1 | 4/2005 | Staines et al. | |
| 7,150,496 B2 | 12/2006 | Fujimoto | |
| 2008/0007094 A1 * | 1/2008 | Ishitobi | 296/193.11 |

FOREIGN PATENT DOCUMENTS

| | | |
|---|---|---|
| JP | 2004 26120 | 1/2004 |
| JP | 2005 75163 | 3/2005 |
| JP | 2006 44542 | 2/2006 |
| JP | 2006 44543 | 2/2006 |

* cited by examiner

*Primary Examiner* — Dennis H Pedder
(74) *Attorney, Agent, or Firm* — Oblon, Spivak, McClelland, Maier & Neustadt, L.L.P.

(57) ABSTRACT

According to an inner panel for vehicles of the present invention, a bead forming surface is so provided as to extend continuously with an upper edge part of a wall rising from a bottom surface of the inner panel. Upper beads and lower beads are formed on the bead forming surface. The upper and lower beads extend in a longitudinal direction of a vehicle and are arranged alternately in a width direction of the vehicle. The bead forming surface is positioned above a middle position between an upper surface of the upper bead and a lower surface of the lower bead. Further, the bead forming surface is positioned lower than the upper surface of the upper bead by 3 mm or more. With this structure, a sufficient first acceleration wave can be secured by expanding a stress propagation range in a direction perpendicular to the length of the beads with respect to the first acceleration wave and, also, by reducing a local deformation to be caused by a deformation load from the above of the vehicle during a head impact. Further, with respect to a load from below of the vehicle when contacting built-in components, the inner panel is easily crushed, which can lower a second acceleration wave.

5 Claims, 6 Drawing Sheets

INNER PANEL FOR VEHICLE

TECHNICAL FIELD

The present invention relates to an inner panel for vehicles constituting a hood of an automobile, etc. More particularly, it relates to an inner panel for vehicles that excels in head impact resistance for protecting a pedestrian in the event of a frontal crush.

BACKGROUND ART

In an automobile equipped with a hood at its body front, the hood of the automobile comprises: an outer panel; an inner panel; and other reinforcing members. Generally, in order to secure rigidity and strength of the hood itself, the panel structure uses a closed sectional structure in which the outer panel and the inner panel are joined together such that spaces are formed between them.

With respect to this type of hood, proposed are structures in which, near a central part of the inner panel, there are provided a plurality of beads having U-shaped cross section extending substantially parallel to each other so as to secure dent resistance and panel stiffness required for the hood and to raise a pedestrian-protective performance in the event of a frontal crush (Patent Documents 1 and 2).

The pedestrian-protective performance in the event of a frontal crush is currently evaluated by an HIC value computed from the acceleration-time waveform at the impact. The smaller the HIC value is, the less likely the injury to the pedestrian head occurs at the impact. For this reason, as described earlier, on condition that the dent resistance and panel stiffness are secured, there is a need for a hood structure capable of reducing the HIC value.

As for acceleration waveforms at the impact of the head on a part near the center of a hood, in general, a first acceleration wave is generated at the impact of the head on the hood at an early stage after the collision. Then, a second acceleration wave is generated when the hood part pressed by the head is moved in the lower direction of a vehicle to impact on built-in components, such as an engine arranged below the hood.

In order to reduce the HIC value, it is effective in particular to make the second acceleration wave small. For that purpose, it is necessary during a head impact to absorb the collision energy before the hood contacts built-in components and it is desirable to secure a sufficient clearance between the hood panel and the built-in components.

However, when considering that required parts for the automobile are installed in a limited space inside the hood, it is often difficult to secure the sufficient clearance between the hood panel and the built-in components.

Accordingly, such a hood structure is desired as the one in which the first acceleration wave at the impact of the head is allowed to be as large as possible to increase the energy absorption amount at an early stage after the impact to reduce the deformation stroke or the second acceleration wave generated by the collision of the hood with built-in components is allowed to be small.

According to the above hood inner structure in which a plurality of U-shaped beads are installed in parallel to each other, by providing the beads, flexural rigidity of the hood panel increases, flexural deformation at the impact of a pedestrian's head is suppressed, and impact loads can be dispersed. Therefore, the area and weight where the displacement is caused by the impact of the head are increased. Accordingly, as compared to the case where the beads are not provided, the first acceleration wave at the impact of the head is made larger. Moreover, since the beads are arranged substantially parallel to each other, deformation is liable to occur at the time of contact with built-in components, and there is an advantage that the second acceleration wave can be made small.

However, the recent demand for pedestrian protection is becoming more and more severe, and further improvement in pedestrian-protective performance is desired.

Therefore, in the above hood inner structure having beads of the U-shaped cross section also, with the aim of further improving the pedestrian-protective performance and in consideration of actual collision conditions, there are provided structures in which the height of the U-shaped cross section is varied according to a part and in which a flat seat is provided in a middle part of the vertical wall of the U-shaped cross section (Patent Documents 3 and 4).

As described earlier, under the condition that the clearance between the hood panel and built-in components is hard to secure sufficiently, in order to reduce the HIC value, it is necessary to further improve the first acceleration wave and reduce the second acceleration wave at the same time. That is, when the clearance between the hood panel and the built-in components becomes smaller, in order to meet the target requirements such as laws and regulations, it is necessary to further enlarge the first acceleration wave. Since the first acceleration wave is dependent on mass of an object to be collided with, it is desirable to enlarge a region where displacement takes place at an early stage after the impact of the head as much as possible. In order to do so, it is desirable for the stress to spread in a larger range at an early stage after the impact. In the case of the above bead structure of the U-shaped cross section, it is necessary to expand the stress propagation in a direction perpendicular to the length of the bead along which a force is not easily transmitted, and to expand the deformation range at an early stage after the impact.

Moreover, when the periphery of the collided portion is locally deformed, the deformation range at an early stage after the impact is reduced. Therefore, it can also be said that it should not be easily deformed locally by the impact load from the above of the vehicle. On the contrary, from the aspect of reducing the second acceleration wave, such a structure is desired that has a small deformation resistance against the load from below of the vehicle due to contact with built-in components and that is easily crushed. However, conventional technologies could not meet the demand of achieving both of them.

[Patent Document 1] JP-A No. 151159/2001
[Patent Document 2] JP-A No. 205866/2003
[Patent Document 3] JP-A No. 044542/2006
[Patent Document 4] JP-A No. 044543/2006

DISCLOSURE OF THE INVENTION

Problem to be Solved by the Invention

The present invention is made in view of the above problems, and its object is to provide an inner panel for vehicles having following properties. That is, a sufficient first acceleration wave is secured by expanding the stress propagation range in a direction perpendicular to the longitudinal direction of the beads with respect to the first acceleration wave and reducing the local deformation being caused by the deformation load from the above of the vehicle during a head impact. Further, by the load from below of the vehicle in contact with built-in components, the inner panel is easily crushed and the second acceleration wave can be made lower.

Means for Solving the Problem

According to the present invention, an inner panel for vehicles combined with an outer panel to constitute a car body hood comprises:
a bottom part;
a wall rising from the bottom part;
a bead forming surface continuous with at least part of an upper edge part of the wall;
a plurality of upward convex upper beads provided on the bead forming surface such that they extend substantially parallel to each other in one direction; and
downward convex lower beads formed on the bead forming surface such that the downward convex beads and the upward convex beads are arranged longitudinally alternately.

It is preferable that the bead forming surface is positioned higher than a middle position between an upper surface of the upper bead and a lower surface of the lower bead and is positioned lower than the upper surface of the upper bead by 3 mm or more. Also, it is preferable that an end part in a longitudinal direction of the upper bead extends to a hem of the bead forming surface. Further, cross sections of the upper bead and the lower bead are an inverted U shape and a U shape, respectively. Still further, it is preferable that the inverted U-shaped part of the upper bead, a flat portion of the bead forming surface, the U-shaped part of the lower bead, and a flat portion of the bead forming surface are arranged longitudinally alternately. Still further, it is preferable that the upper beads and lower beads extend in a longitudinal direction of a vehicle and are arranged alternately in a width direction of the vehicle. Still further, it is preferable that a reinforcing member is joined to a front part of the lower bead in the longitudinal direction of the vehicle.

Effect of the Invention

According to the present invention, there is provided the bead forming surface between the upper wall of the upper bead and the lower wall of the lower bead, or the contact line of the upper wall of the upper bead and the lower wall of the lower bead is at the same level with respect to the bead forming surface. Therefore, when the inner panel comes into contact with the built-in components during the impact, bending deformation of the upper wall of the upper bead and the lower wall of the lower bead is promoted by a restraint force by the bead forming surface. Further, when the deformation load is reduced, the second acceleration wave can be made small.

BRIEF DESCRIPTION OF THE DRAWINGS

1: Inner panel
2: Bottom surface
3: Wall
4: Bead forming surface
5: Lower bead
5a: Lower wall
5b: Lower flat surface
6: Upper bead
6a: Upper wall
6b: Upper flat surface
7: Dent reinforcing member

BEST MODE FOR CARRYING OUT THE INVENTION

Figure 1:
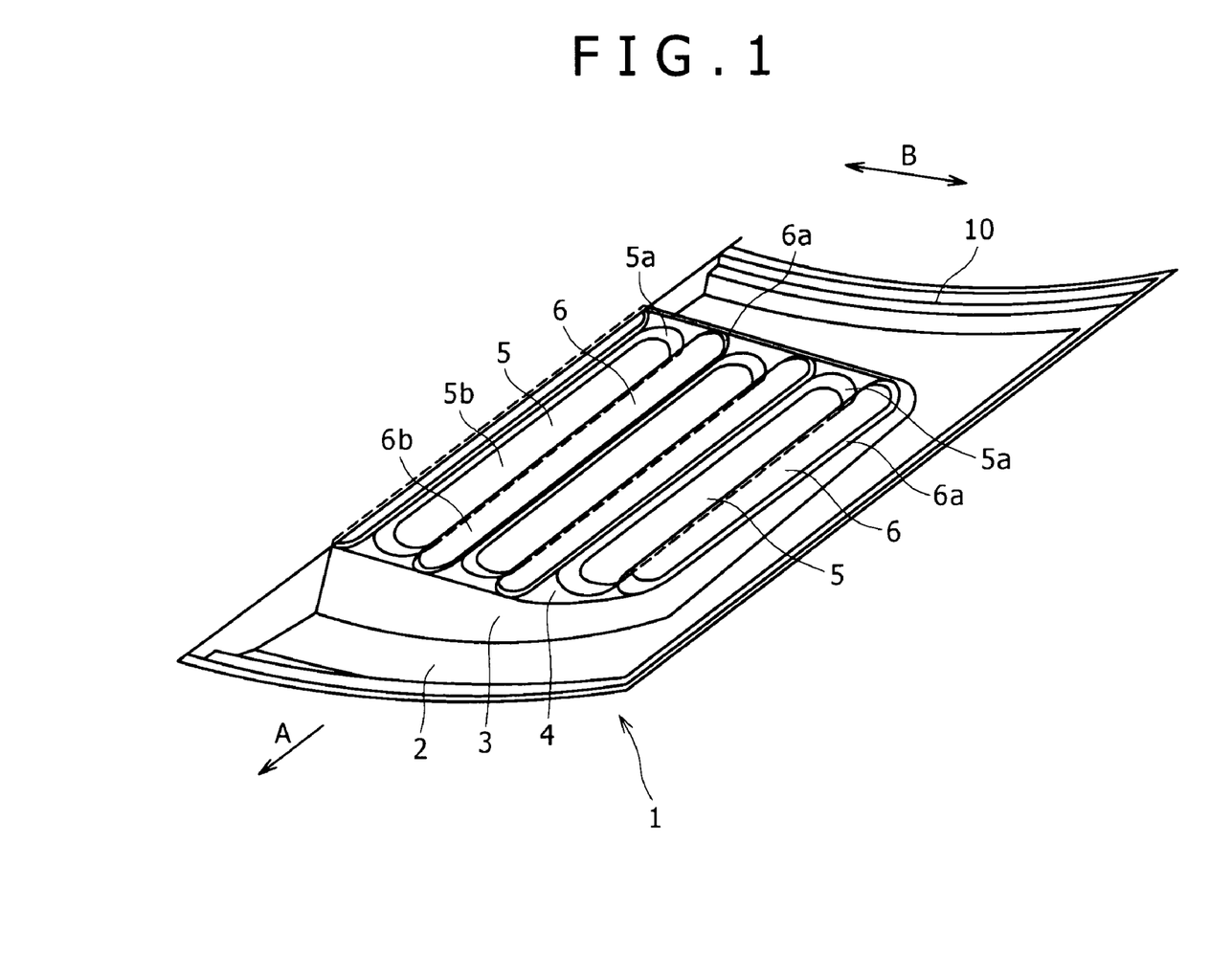
FIG. 1 is a perspective view showing an inner panel for vehicles according to an embodiment of the present invention.

With reference to accompanying drawings, embodiments of the present invention will be explained specifically. FIG. 1 is a perspective view showing an inner panel for vehicles according an embodiment of the present invention. In the inner panel 1 of FIG. 1, an upper surface of the left-half side alone in the moving direction A of the vehicle is shown. An outer panel is arranged above the inner panel 1.

On a substantially central part of the inner panel 1, there is provided a bead forming surface 4 rising in a gently sloped manner with respect to a bottom surface 2 of the inner panel 1. The bead forming surface 4 is so formed as to extend continuously with an upper edge part of a wall 3 rising from the bottom surface 2 of the inner panel 1. In addition, an end part 10 of the inner panel 1 has risen upward. Therefore, the bottom surface 2 of the inner panel 1 is so formed as to surround the bead forming surface 4 in a ditch-like manner on the periphery of the inner panel 1. Part of the upper edge of the wall 3 may not extend continuously with the bead forming surface 4. That is, it serves the purpose if at least part of the upper edge of the wall 3 extends continuously with the bead forming surface 4.

On the bead forming surface 4, there are formed upper beads 6 and lower beads 5 extending in the longitudinal direction of the vehicle such that they are arranged alternately in a width direction B of the vehicle. The lower bead 5 comprises: a lower wall 5a inclined downward with respect to the bead forming surface 4; and a lower flat surface 5b extending continuously with the lower edge part of the lower wall 5a. The upper bead 6 comprises: an upper wall 6a inclined upward with respect to the bead forming surface; and an upper flat surface 6b extending continuously with the upper edge part of the upper wall 6a. Therefore, the upper bead 6 has an inverted U-shape cross section and the lower bead 5 has a U-shape cross section.

In this case, between the upper bead 6 and the lower bead 5, there can be provided a part at the same level with respect to the bead forming surface 4. That is, as seen in the cross section in the width direction B of the vehicle, the bead forming surface 4 is positioned between the lower wall 5a of the lower bead 5 and the upper wall 6a of the upper bead 6.

Further, in the width direction B of the vehicle, there can be arranged, longitudinally alternately, the inverted U-shape of the upper bead 6, the flat portion of the bead forming surface, the U-shape of the lower bead 5, and the flat portion of the bead forming surface.

Also, it is preferable that the bead forming surface 4 is positioned above the middle position between the upper flat surface 6b of the upper bead 6 and the lower flat surface 5b of the lower bead 5. Further, the bead forming surface 4 is preferably positioned lower than the upper flat surface 6b of the upper bead 6 by 3 mm or more.

Figure 2:
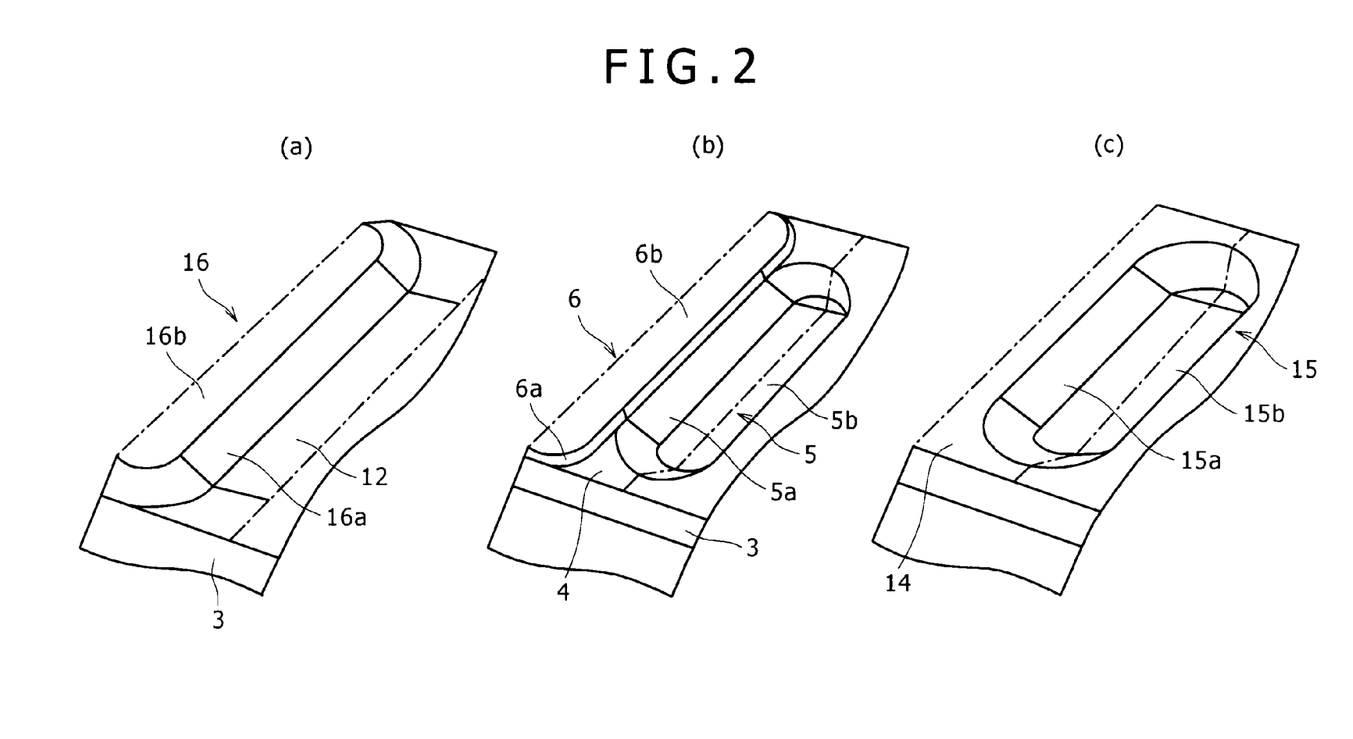
FIG. 2(a) is a perspective view showing a construction of beads according to Comparative example 1.
FIG. 2(b) is a perspective view showing a construction of beads according to an embodiment of the present invention.
FIG. 2(c) is a perspective view showing a construction of beads according to Comparative example 2.

Next, with reference to comparative examples which differ from the construction of the present invention, effects of the inner panel for vehicles of the present embodiment constructed as above will be explained. FIG. 2(a) is a perspective view showing a construction of a bead of Comparative example 1, FIG. 2(b) is a perspective view showing a construction of beads of an embodiment according to the present invention, and FIG. 2(c) is a perspective view showing a construction of a bead of Comparative example 2. In Comparative example 1 of FIG. 2(a), an upward convex upper bead 16 is formed on a bead forming surface 12. In Comparative example 2 of FIG. 2(c), a downward convex lower bead 15 is formed on a bead forming surface 14 of the inner panel. The upper bead 16 of Comparative example 1 is so formed as to rise upward with respect to the bead forming surface 12. Further, the upper bead 16 comprises: an upper wall 16a inclined upward from the bead forming surface 12; and an upper flat surface 16b extending continuously with the upper edge part of the upper wall 16a. Further, the lower bead 15 of Comparative example 2 is formed on the bead forming surface 14 rising from the bottom surface of the inner panel. Further, the lower bead 15 of Comparative example 2 comprises: a lower wall 15a inclined downward from the bead forming surface 14; and a lower flat surface 15b extending continuously with a lower edge part of the lower wall 15a. Thus, in Comparative example 1, the upper bead alone is formed, and in Comparative example 2, the lower bead alone is formed.

Assume that, to such an inner panel, an impact is applied downwardly from the above of the inner panel. In the case of Comparative example 1 (FIG. 2(a)), after the stress has propagated along the direction of the bead, through the vertical wall 16a of the upper bead, the stress is propagated to a vertical wall 3 connecting a bottom surface 2 (not shown) of the inner panel with the beard forming surface 12, and stress propagation occurs in the width direction of the vehicle along the vertical wall 3. The upper wall 16a rises from the bead forming surface 12 and is positioned relatively below the vehicle. Therefore, the stress propagation in the width direction of the vehicle is delayed, and the first acceleration wave is reduced that much.

Moreover, the length of the upper wall 16a positioned between the outer panel above the inner panel 1 and a bead forming surface 4 becomes relatively long. Therefore, as compared with the embodiment of the present invention, the upper wall 16a is liable to be locally deformed by the impact from the above, reducing the first acceleration wave. Furthermore, the upper flat surface 16b of the beard part is joined to the outer panel and the lower end of the upper wall 16a is continuous with the bead forming surface 12. Therefore, both the upper and lower flanges of the bead are restrained and the deformation resistance is high when the inner panel collides with built-in components, enlarging the second acceleration wave.

Further, in the case of Comparative example 2 (FIG. 2(c)), the bead forming surface 14 is joined to the outer panel with use of a resin. The bead forming surface 14 extends in the width direction of the vehicle. Therefore, the stress propagation occurs easily in a longitudinal direction of the bead and a direction perpendicular to the longitudinal direction of the bead, allowing the first acceleration wave to be larger. Moreover, the lower end of the bead becomes a free end and the vertical wall of the bead is long. Therefore, it is easily crushed and the deformation resistance in the collision with the inner panel is small. However, the bead forming surface is placed at an upper position as compared with Comparative example 1. Therefore, the flexural rigidity of the inner panel itself becomes low, and the acceleration after the first acceleration wave becomes low easily. Furthermore, there is required a plane (part of the bead forming surface 14) to be joined to the outer panel by the resin at both ends of the bead 15. Therefore, there are problems that flexural deformation easily occurs at this portion, the acceleration falls sharply after first acceleration wave, and an energy absorption stroke becomes larger. For this reason, if the clearance between the inner panel and the built-in components is narrow, the inner panel comes into contact with the built-in components in a state where sufficient energy absorption is not performed, causing an excessive second acceleration wave.

On the other hand, in the case of the present invention (FIG. 2(b)), the upper wall 6a of the upper bead 6 has risen from the bead forming surface 4 extending continuously with the upper edge part of the wall 3 rising from the bottom surface of the inner panel. As compared with Comparative example 1, the upper bead 6 is provided in an upper direction of the vehicle. Therefore, the stress propagation is likely to occur in a longitudinal direction of the bead and a direction perpendicular to such a direction. Moreover, in the present invention, because of the upper bead 6, a distance between the bead forming surface 4 and the outer panel becomes longer than the distance between the bead forming surface 14 and the outer panel of Comparative example 2. As the bead forming surface 4 is lower than the bead forming surface 14 of Comparative example 2, the flexural rigidity of the panel becomes greater, and the first acceleration wave becomes larger.

Moreover, as shown in FIG. 2(b), the length of the upward convex upper bead 6 is made to be longer than the downward convex lower bead 5. Further, the end part in the longitudinal direction of the upper bead 6 is made to coincide with the ridge (wall 3) of the bead forming surface 4. As a result, between the end part of the upper bead 6 and the wall 3, there is no flat portion of the bead forming surface 4. Thus, the bead forming surface 4 becomes no more continuous in the width direction of the vehicle. Therefore, it becomes possible to prevent the local flexural deformation occurring at this portion and, thereby, a sharp fall in acceleration after the first acceleration wave can also be suppressed.

Moreover, the vertical wall of the upper bead becomes shorter as compared with Comparative example 1. As a result, the local deformation is not likely to occur when the impact comes from the above. At the same time, since the vertical wall of the lower bead is relatively long and the lower flange is a free end, when collided with the inner panel, there is a merit of being easily deformed by deformation load applied from below.

If the position of the bead forming surface, namely, the position of a surface between the upper bead 6 and the lower bead 5 is too high, the flexural rigidity of the inner panel as a component is lowered. Also, bending deformation at the bead forming surface is likely to occur. Further, assuming that the sum of the height of upper bead and the height of the lower bead is fixed, when the bead forming surface is too low, the upper bead is likely to be deformed. Also, since the deformation resistance of the lower bead increases, preferable effects cannot be obtained.

That is, it is preferable that the vertical wall of the upper bead is shorter than the vertical wall of the lower bead. Further, it is preferable that the bead forming surface 4 is placed at a position higher by one half of the distance between the upper flat surface 6b of the upper bead 6 and the lower flat surface 5b of the lower bead 5.

When the bead forming surface 4 is positioned above the surface lower than the upper flat surface 6b of the upper bead 6 by 3 mm, bending deformation is likely to occur at the bead forming surface, which is not desirable. Furthermore, if the distance between the bead forming surface and the outer panel is too short, the bead forming surface of the inner panel may come into contact with the outer panel when a static load is applied from the above of the vehicle, causing a problem to dent-resistant performance (namely, deformation-resistant performance when a static load is applied from the above of the outer panel). Therefore, it is preferable that the bead forming surface 4 is placed at a position higher by more than one half of the distance between the upper flat surface 6b and the lower flat surface 5b and at a position more than 3 mm below the upper flat surface 6b.

Figure 3:
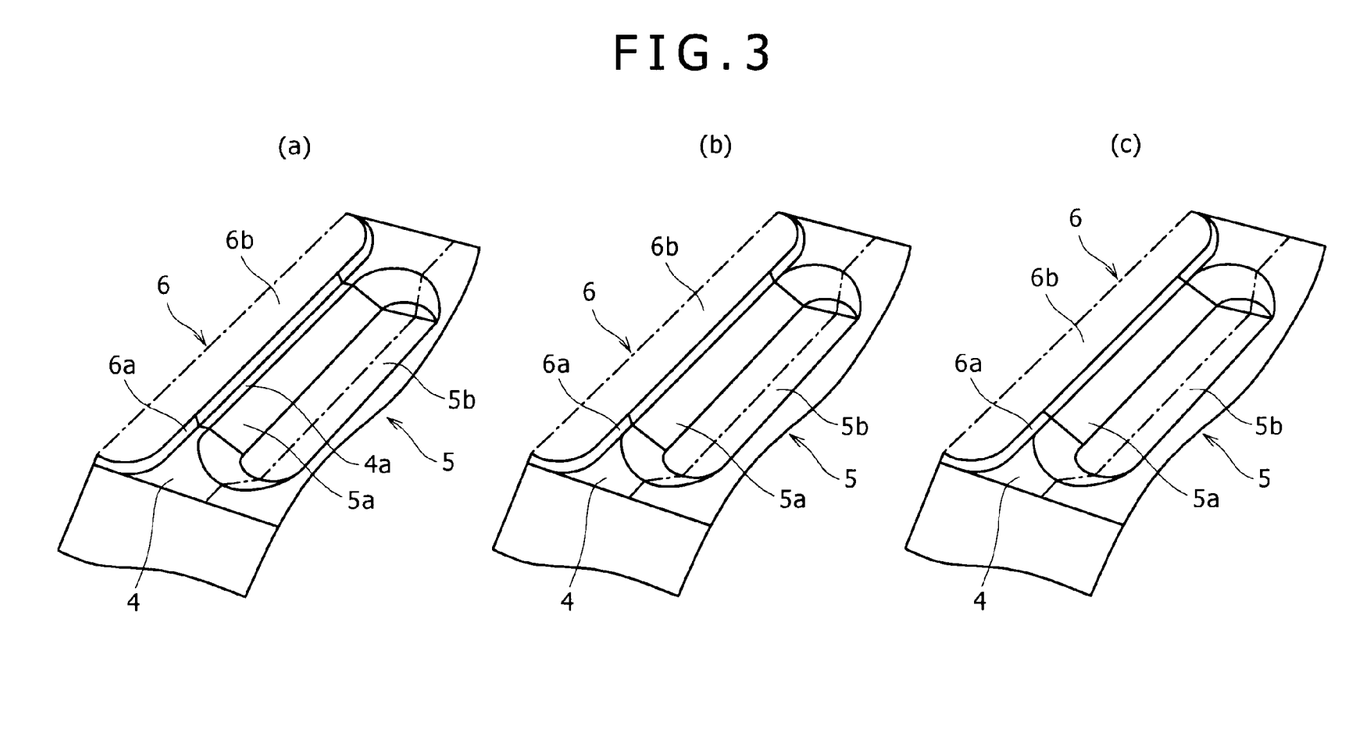
FIGS. 3(a) to 3(c) are perspective views showing modes of upper and lower beads.
Figure 6:
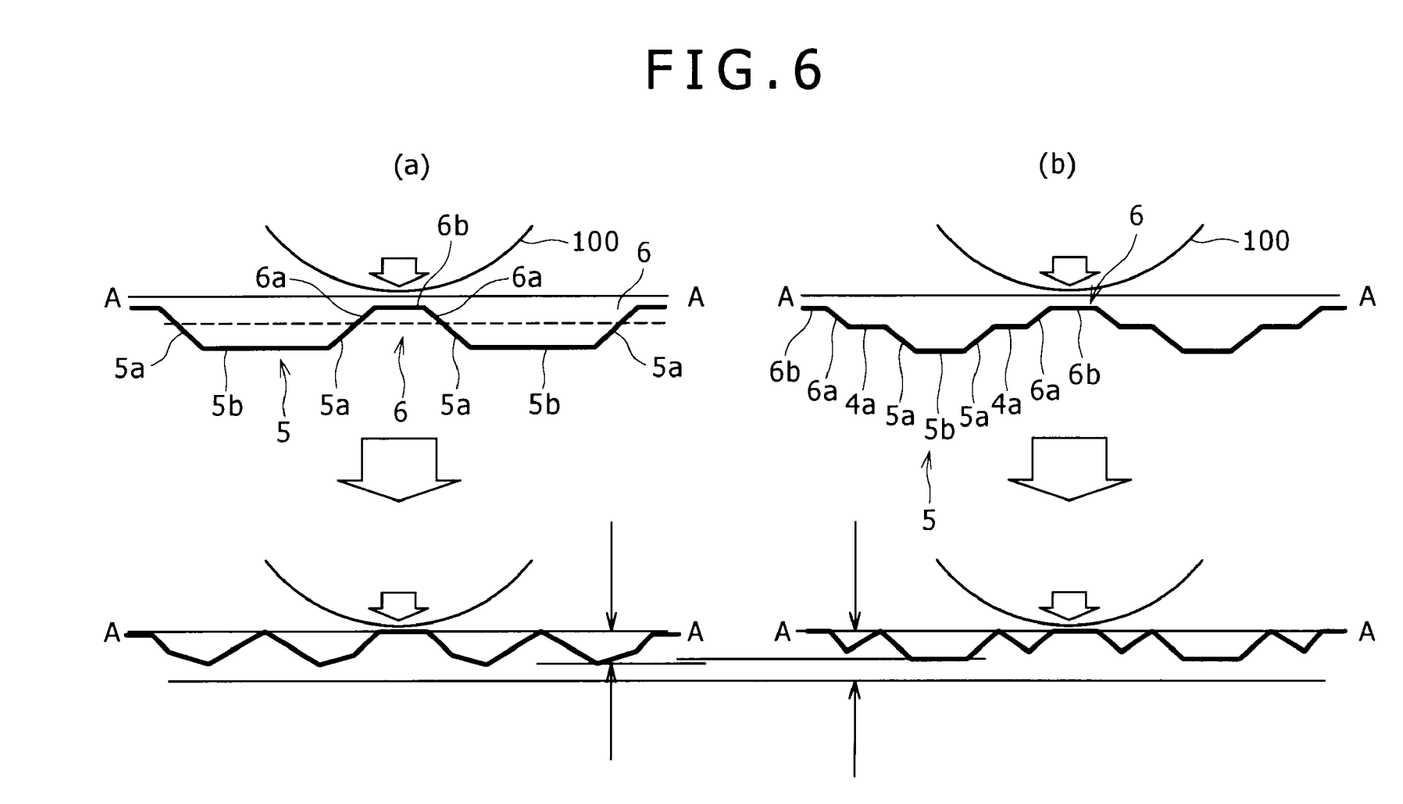
FIG. 6(a) is a schematic diagram showing a modified mode of the beads in which a flat portion 4a of the bead forming surface 4 is not provided between the upper bead 6 and the lower bead 5.
FIG. 6(b) is a schematic diagram showing a modified mode of the beads in which the flat portion 4a is provided.

As shown in FIGS. 3(a) and 6(b), suppose that there exists a flat portion 4a of the bead forming surface 4 which is a middle surface between the upper bead 6 and the lower bead 5. At the impact of the pedestrian's head 100, the load transmitted from the upper bead 6 is taken by the whole flat portion 4a of the bead forming surface 4, promoting the stress propagation in the longitudinal direction of the vehicle. Therefore, the first acceleration wave can be enlarged further. Moreover, when both end parts of the flat portion 4a is deformed in a bending manner, as compared with the case where the flat surface 4a is not provided, there exists one additional bent point. Therefore, at the impact on the inner panel, the timing with which extreme increase in load occurs is delayed, being able to delay the occurrence of the second acceleration wave. In addition, if the width of the flat portion is too wide, the width of the lower flange 5b of the lower bead 5 becomes smaller, and its flexural rigidity as a hood is lowered. Therefore, the width of the flat portion can be suitably determined according to the acceleration waveform needed.

Further, as shown in FIG. 3(b), the upper bead 6 and the lower bead 5 may be formed such that an angle of inclination of an upper wall 6a inclined upward of the upper bead 6 may be different from an angle of inclination of a lower wall 5a inclined downward of the lower bead 5. In the example shown in FIG. 3(b), the angle of the lower wall 5a of the lower bead 5 of the vehicle is gently inclined and the angle of the upper wall 6a of the upper bead 6 is sharply inclined. In this case, deformation is likely to be generated by the load from below and deformation is less likely to be generated by the load from the above, producing more preferable effect. Moreover, in particular, if the angle of the upper wall of the upper bead 6 is set to be sharply inclined, the area of an upper end flange 6b of the upper bead 6 becomes larger, increasing the degree of freedom of the joint position with the outer panel by a resin. The angles of inclination of these vertical walls may be suitably determined from the aspects of the necessary acceleration waveform and dent characteristic at the impact of the pedestrian's head or fracture avoidance in press molding.

Moreover, as shown in FIG. 3(c), the angle of inclination of the upper wall 6a of the upper bead 6 may coincide with the angle of inclination of the lower wall 5a of the lower bead 5.

In addition, with regard to FIGS. 3(b) and 3(c), a straight line to show a cross section is added at a position where a curved surface portion of the end part is connected to a plane portion. In FIG. 3(b), an angle of the cross section at a position of the bead forming surface 4 is changed, whereas there is no change in angle in FIG. 3(c).

Figure 4:
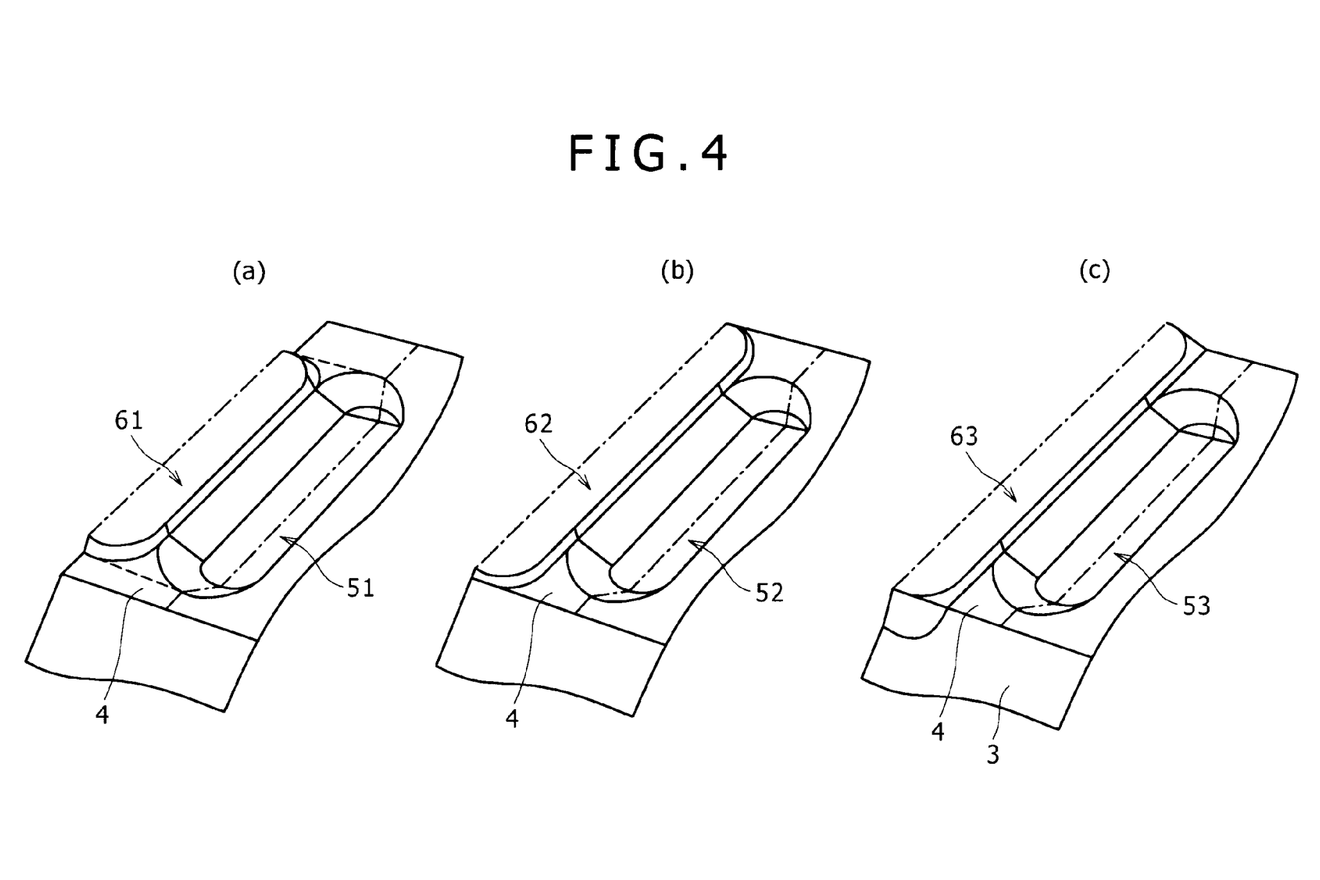
FIGS. 4(a) to 4(c) are perspective views similarly showing modes of upper and lower beads.

As for the modes of the end part in the longitudinal direction of the beads, there are ones as shown in FIGS. 4(a), 4(b), and 4(c). As shown in FIG. 4(a), the length of an upper bead 61 and the length of a lower bead 51 can be the same. Further, the same space can be provided between the end parts of the upper and lower beads 61 and 51, and a hem of the bead forming surface 4. However, in this case, flexural deformation is likely to occur at a flat portion (bead forming surface 4) between the end parts of the upper and lower beads 61 and 51 and the hem of the bead forming surface 4 as a boundary, decreasing the acceleration after the first acceleration wave. Therefore, it is preferable that the length of the upper bead is greater than the length of the lower bead, and the end part in the longitudinal direction of the upper bead is closer to the hem of the bead forming surface 4 than the end portion in the longitudinal direction of the lower bead. An upper bead 62 shown in FIG. 4(b) is longer than the lower bead 52, and both ends in the longitudinal direction of the upper bead 62 extend to the hem of the bead forming surface 4. Thereby, the flexural deformation at the flat portion between the end part in the longitudinal direction of the upper bead 62 and the hem of the bead forming surface 4 is suppressed, raising acceleration after the first acceleration wave. The length of the bead can be suitably determined according to a target acceleration waveform.

Furthermore, as shown in FIG. 4(c), by extending the end part in the longitudinal direction of an upper bead 63 to a middle part of the wall 3 of the bead forming surface 4, the flexural deformation at the hem of the wall 3 is also suppressed, further raising the deformation rigidity.

Figure 5:
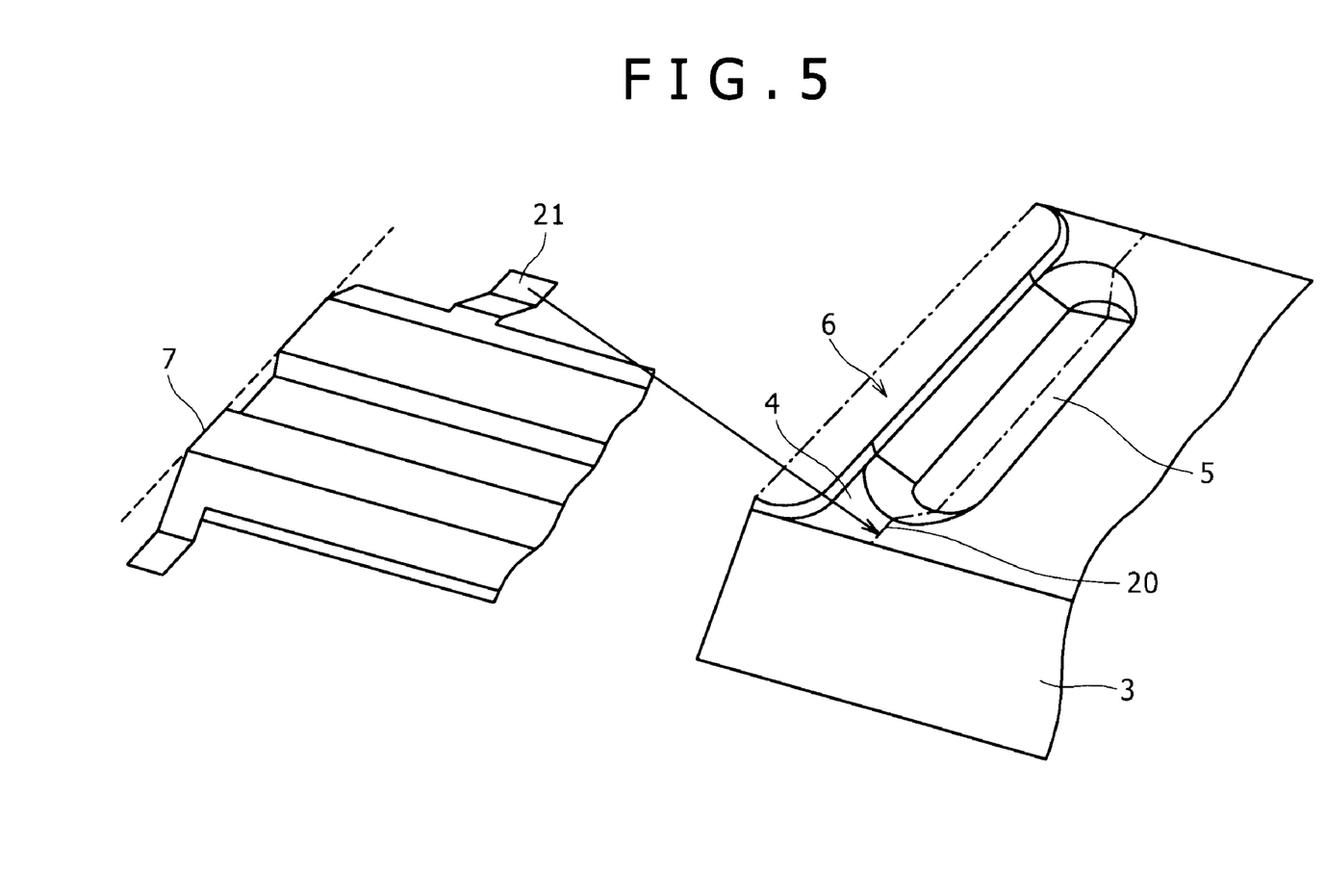
FIG. 5 is a perspective view showing a dent reinforcing member, and shows a state where the dent reinforcing member is joined to a bead forming surface of the inner panel.

In FIG. 5, a joint leg portion 21 of a dent reinforcing panel 7 is joined to a part 20 of the bead forming surface between the lower bead 5 formed on the bead forming surface 4 and the hem of the bead forming surface 4. Accordingly, the stress propagates also to the dent reinforcing panel 7 through the joint leg portion of the dent reinforcing panel 7 during a head impact. At the same time, through the dent reinforcing panel 7, the stress easily propagates in the width direction of the vehicle, which can further enlarge the first acceleration wave. Also, in FIG. 5, right and left drawings are based on different scales. That is, the left drawing shows an enlarged view.

The invention claimed is:

1. An inner panel for vehicles combined with an outer panel to constitute a car body hood, comprising:
   a bottom part;
   a wall rising from said bottom part;
   a bead forming surface continuous with at least part of an upper edge part of said wall;
   a plurality of upward convex upper beads provided on said bead forming surface such that the beads extend substantially parallel to each other in one direction; and
   downward convex lower beads formed on said bead forming surface such that the downward convex beads and said upward convex beads are arranged longitudinally alternately,
   wherein cross sections of said upper bead and lower bead are an inverted U shape and a U shape, respectively, and
   wherein the inverted U-shaped part of the upper bead, a flat portion of the bead forming surface, the U-shaped part of the lower bead, and a flat portion of the bead forming surface are arranged longitudinally alternately.

2. An inner panel for vehicles according to claim 1, wherein said bead forming surface is positioned higher than a middle position between an upper surface of said upper bead and a lower surface of said lower bead and is positioned lower than the upper surface of said upper bead by 3 mm or more.

3. An inner panel for vehicles according to claim 1, wherein an end part in a longitudinal direction of said upper bead extends to a hem of said bead forming surface.

4. An inner panel for vehicles according to claim 1, wherein said upper beads and lower beads extend in a longitudinal direction of a vehicle and are arranged alternately in a width direction of the vehicle.

5. An inner panel for vehicles according to claim 1, wherein a reinforcing member is joined to a front part of said lower bead in the longitudinal direction of the vehicle.

\* \* \* \* \*